(12) United States Patent
Kamishita et al.

(10) Patent No.: US 7,527,376 B2
(45) Date of Patent: *May 5, 2009

(54) METHOD FOR DESIGNING SPECTACLE LENS, SPECTACLE LENS, AND SPECTACLES

(75) Inventors: Kaoru Kamishita, Minowa-machi (JP); Ayumu Ito, Minowa-machi (JP); Tadashi Kaga, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/828,135

(22) Filed: Jul. 25, 2007

(65) Prior Publication Data

US 2008/0024719 A1 Jan. 31, 2008

(30) Foreign Application Priority Data

Jul. 25, 2006 (JP) ............................. 2006-201673

(51) Int. Cl.
*G02C 7/02* (2006.01)

(52) U.S. Cl. .................... 351/177; 351/41; 351/159; 351/176

(58) Field of Classification Search ............... 351/41, 351/159, 176, 177
See application file for complete search history.

(56) References Cited

U.S. PATENT DOCUMENTS

| | | | |
|---|---|---|---|
| 6,142,624 | A | 11/2000 | Morris et al. |
| 6,361,166 | B1 | 3/2002 | Perrott et al. |
| 6,918,822 | B2 | 7/2005 | Arai et al. |
| 7,070,274 | B2 * | 7/2006 | Kamishita et al. ........... 351/159 |
| 7,090,349 | B2 | 8/2006 | Perrott et al. |
| 7,360,891 | B2 | 4/2008 | Yanari |
| 2002/0118337 | A1 | 8/2002 | Perrott et al. |
| 2002/0149739 | A1 | 10/2002 | Perrott et al. |
| 2005/0122470 | A1 | 6/2005 | Perrott et al. |
| 2005/0155692 | A1 | 7/2005 | Arai et al. |
| 2006/0007394 | A1 | 1/2006 | Shirayanagi |
| 2006/0274258 | A1 * | 12/2006 | Shirayanagi et al. ........ 351/159 |

FOREIGN PATENT DOCUMENTS

| | | |
|---|---|---|
| EP | 1 582 909 A1 | 10/2005 |
| JP | 11-500542 A | 1/1999 |
| JP | 11-500543 A | 1/1999 |
| JP | 2000-506628 A | 5/2000 |
| JP | 2005-511594 A | 4/2002 |

(Continued)

*Primary Examiner*—Scott J Sugarman
(74) *Attorney, Agent, or Firm*—Sughrue Mion, PLLC

(57) ABSTRACT

A method of correcting the effects of a bend angle of 200 degrees or larger of spectacle frames, and astigmatism correcting characteristics in such spectacle frames. An exemplary embodiment of the present invention includes a design method for a spectacle lens mounted in a spectacle frame having a bend angle of 200 degrees or larger including an astigmatic power adding step, on the object side refractive surface or eyeball side refractive surface of the spectacle lens, for canceling astigmatic aberration caused by the bend angle of the spectacle frame, at a design reference point of the spectacle lens, and a step setting prismatic power by tilting the refractive surface, which is on an object side or an eyeball side, of the spectacle lens for canceling prismatic power caused by the bend angle of the spectacle frame, at the design reference point of the spectacle lens.

6 Claims, 6 Drawing Sheets

FOREIGN PATENT DOCUMENTS

| | | |
|---|---|---|
| JP | 2004-133024 | 4/2004 |
| JP | 2005-284059 A | 10/2005 |
| JP | 2006-030785 | 2/2006 |
| JP | 2006-171792 | 6/2006 |
| WO | 97/21136 A1 | 6/1997 |
| WO | 97/21139 A1 | 8/1997 |
| WO | 99/52480 A1 | 10/1999 |

* cited by examiner

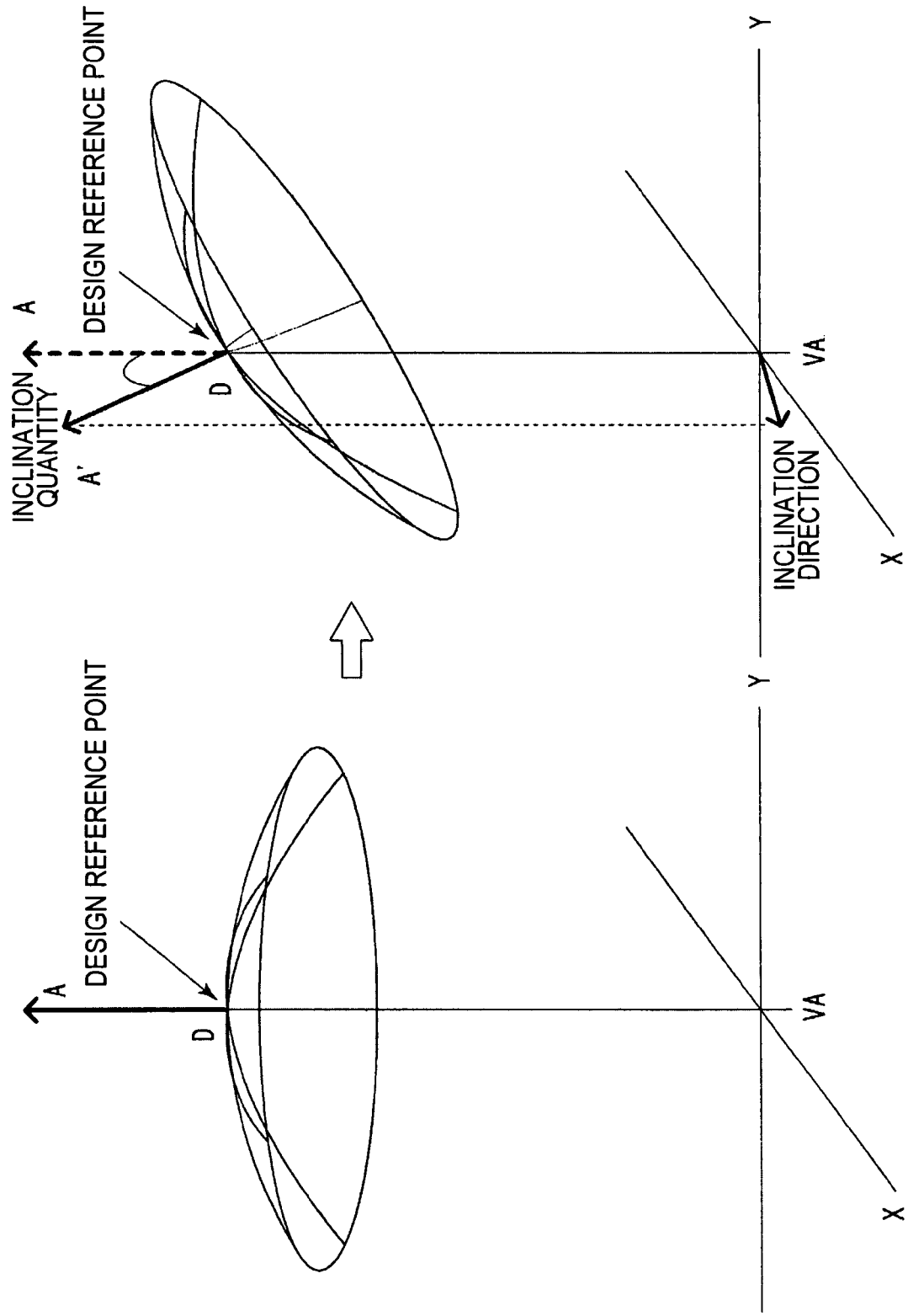

| ASTIGMATIC ABERRATION | MEAN DIOPTRIC POWER DISTRIBUTION | ASTIGMATIC ABERRATION WITHOUT PRESCRIBED ASTIGMATISM |
|---|---|---|
| No. 5 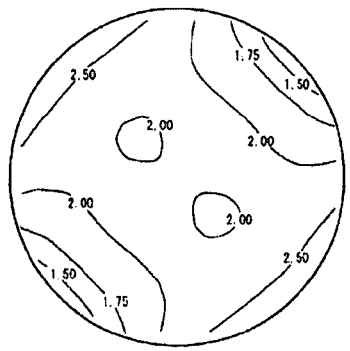 | 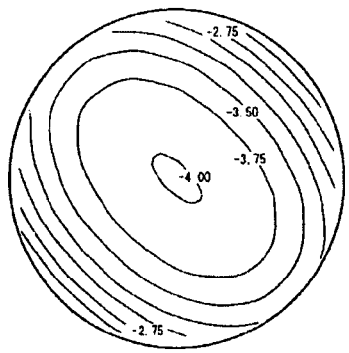 | 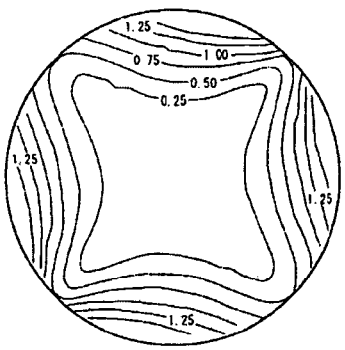 |
| No. 6 | | 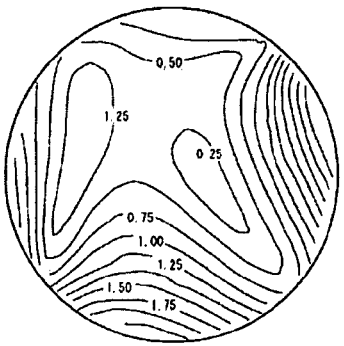 |
| No. 7 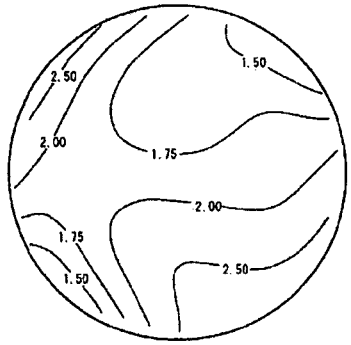 | | 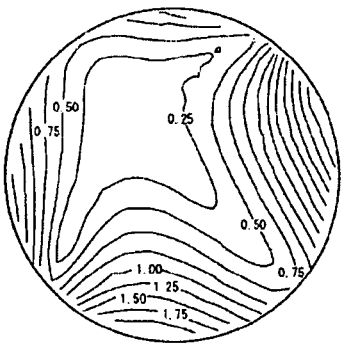 |
| No. 8 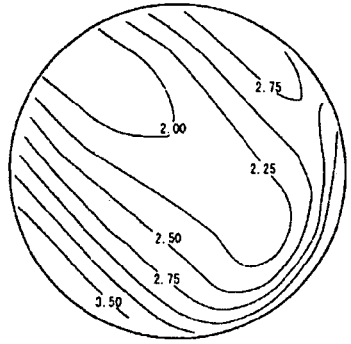 | | 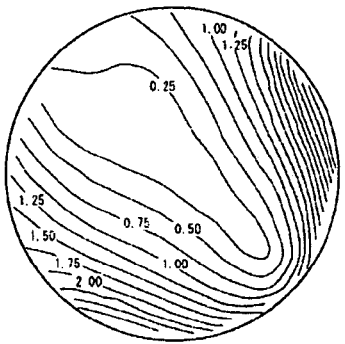 |
FIG. 6

METHOD FOR DESIGNING SPECTACLE LENS, SPECTACLE LENS, AND SPECTACLES

CROSS-REFERENCE TO RELATED APPLICATIONS

This application claims priority from Japanese Patent Application No. 2006-201673, filed on Jul. 25, 2006 in the Japan Patent Office, the disclosure of which is incorporated herein by reference in its entirety.

BACKGROUND OF THE INVENTION

1. Technical Field

The present invention relates to a method for designing a spectacle lens mounted in a spectacle frame having a large bend angle, such as a wraparound-type spectacle frame, a spectacle lens, and a pair of spectacles mounted in a spectacle frame.

2. Description of the Related Art

Currently, a wraparound-type spectacle frame, which is mainly used for sports glasses, has been increasingly used in activities other than sports. FIGS. 3A and 3B are perspective views of an example of a wraparound-type spectacle frame as viewed obliquely and from above, respectively. The wraparound-type spectacle frame illustrated in FIGS. 3A and 3B has a large bend angle, which is contoured with the shape of the wearer's face. As a result, lenses mounted in the wraparound-type spectacle frame extend to the sides of the face, and provide a wide panning range for viewing. Because of this feature, the wraparound-type spectacle frame is ideal for use in sports, for example, to provide eye protection specifically during athletic activity.

With the rise in the number of the athletes wearing wraparound-type spectacle frames, the number of non-athletes wearing the wraparound-type spectacle frames is also increasing. As a result, the number of people who require corrective lenses and desire to wear the wraparound-type spectacle frame is also increasing.

In order to meet this demand, JP-A-2005-284059 discloses an optical design method for a wraparound-type spectacle frame having a large bend angle.

However, the above reference discloses only correction for the effects of the bend angle and the pantoscopic angle. Although individuals with astigmatism desire to use wraparound-type spectacle frames, this technique does not provide a method for creating a lens that corrects astigmatism in wraparound-type spectacle frames.

SUMMARY OF THE INVENTION

Accordingly, the present invention provides a method for designing a spectacle lens not only capable of correcting effects of bend angle and pantoscopic angle, but also has cylindrical power for a spectacle lens mounted in a spectacle frame having a large bend angle.

Another aspect of the present invention is to provide a spectacle lens mounted in a spectacle frame having a large bend angle, and spectacles mounted in a spectacle frame having a large bend angle.

According to one aspect of the present invention, a method for designing a spectacle lens mounted in a spectacle frame having a bend angle of 200 degrees or larger is provided. The method includes an astigmatic power adding step on the object side of a refractive surface (the outside surface of the lens) or an eyeball side of a refractive surface (the inside surface of the lens) of the spectacle lens, that adds astigmatic power for canceling an astigmatic aberration caused by the bend angle of the spectacle frame at a design reference point of the spectacle lens, a prismatic power setting step by tilting the refractive surface, which is on the object side or eyeball side of the spectacle lens, which sets prismatic power for canceling prismatic power caused by the bend angle of the spectacle frame at the design reference point of the spectacle lens. The method further utilizes a line, referred to as a first reference meridian, which extends from the design reference point to the edge of the spectacle lens in one direction which is a projected direction when a surface normal line at the design reference point of the spectacle lens having the bend angle of the spectacle frame, is projected on a flat plane crossing the visual axis at right angles; a line, referred to as a second reference meridian, which extends from the design reference point to the edge of the spectacle lens in the direction opposite to the direction of the first reference meridian; a line, referred to as a third reference meridian, which extends from the design reference point to the edge of the spectacle lens in a third direction, wherein the third reference meridian crosses the first reference meridian at the reference point at a right angle; and a line, referred to as a fourth reference meridian, which extends from the design reference point to the edge of the spectacle lens in the direction opposite to the direction of the third reference meridian.

The method for designing a spectacle lens further includes a first step that sets a plurality of reference meridians including at least the first through fourth reference meridians, a second step that obtains aspherical surface quantities optimizing optical performance on the respective reference meridians after the first step, and a third step that obtains aspherical surface quantities between the respective reference meridians by interpolation after the second step.

According to the method for designing the spectacle lens in the first aspect of the invention, astigmatic power and prismatic power are added to the entire refractive surface on the object side or the eyeball side so as to cancel effects caused by the bend angle at an arbitrary design reference point. Since the effect of the bend angle cannot be corrected by only adding the astigmatic power and prismatic power in areas other than the design reference point, the design method for the spectacle lens according to the first aspect of the invention therefore includes the first through third steps for obtaining aspherical surface quantities which are added to correct the effect caused by the bend angle for the entire surface of the spectacle lens. More specifically, the directions where the variation of the inclination is a maximum and a minimum according to the bend angle are established as reference meridians. Then, aspherical surface quantities providing the optimum optical properties on the reference meridians are calculated, and aspherical surface quantities between the reference meridians are obtained by interpolation.

In the design method for the spectacle lens of the first aspect of the present invention, the spectacle lens is an astigmatic power lens having astigmatism correcting characteristics based on a line, which extends from the design reference point of the spectacle lens to the edge of the spectacle lens in one direction along a cylinder axis is a first astigmatic reference meridian; a line, which extends from the design reference point to the edge of the spectacle lens in the direction opposite to the direction of the first astigmatic reference meridian is a second astigmatic reference meridian; a line, which extends from the reference design point to the edge of the spectacle lens in a seventh direction, wherein the third astigmatic reference meridian crosses the first astigmatic reference meridian at the design reference point at a right angle, is a third astigmatic reference meridian; and a line, which extends from the design reference point to the edge of the spectacle lens in the direction opposite to the direction of the third astigmatic reference meridian is a fourth astigmatic reference meridian. In an aspect of the present invention, a first step for setting a plurality of reference meridians including at least the first through fourth reference meridians and the first through fourth astigmatic reference meridians, is included.

In this method for designing the spectacle lens for establishing reference meridians according to the first aspect of the present invention, when astigmatic power for correcting astigmatism is added, the effect caused by the variation of target dioptric power in accordance with the angles of the meridians can be corrected simultaneously while correcting the effect of the bend angle only by adding astigmatic reference meridians which indicates the direction of the astigmatic axis to the reference meridians.

In the design method for the spectacle lens according to the first aspect of the present invention, an astigmatic power adding step, which adds astigmatic power on the object side refractive surface or eyeball side refractive surface of the spectacle lens for canceling aberration caused by a pantoscopic angle of the spectacle frame at the design reference point of the spectacle lens, and a setting prismatic power step by tilting the refractive surface, which is on an object side or an eyeball side, of the spectacle lens for canceling prismatic power, caused by the pantoscopic angle of the spectacle frame, at the design reference point of the spectacle lens are included, and the line extending from the design reference point to the edge of the spectacle lens in a direction is a first reference meridian, the direction is a projected direction when a surface normal line at the design reference point of the spectacle lens with a bend angle and the pantoscopic angle of the spectacle frame is projected onto a flat plane, which crosses the visual axis at right angles.

When the spectacle frame has an inclination angle which causes an effect larger than an ignorable level, the astigmatic power and prismatic power are added to the entire refractive surface so as to cancel the effect caused by the inclination angle at the design reference point. In addition, the effect of the bend angle and the effect of the inclination angle can be simultaneously corrected by accounting for the bend angle and the inclination angle in establishing the first reference meridian. This is accomplished by including the aspherical surface quantities for correcting the effect of the inclination angle.

A spectacle lens provided according to a second aspect of the present invention is manufactured by the method for designing the spectacle lens according to the first aspect of the present invention.

A spectacle lens provided according to a third aspect of the present invention is amounted in a spectacle frame having a bend angle of 200 degrees or larger and is an astigmatic power line.

Spectacles (eyeglasses) provided according to a fourth aspect of the present invention have spectacle lenses, wherein the spectacle lenses are astigmatic power lenses and a spectacle frame having a bend angle of 200 degrees or larger.

According to the above aspects of the present invention, prismatic power and aberration caused by the bend angle and the resulting astigmatic power are canceled, and therefore clear vision without blurriness can be obtained.

BRIEF DESCRIPTION OF THE DRAWINGS

The invention will be described with reference to the accompanying drawings, wherein like numbers refer to like elements.

FIGS. 1A and 1B are schematic illustrations of setting reference meridians.

FIG. 3A is a perspective view as viewed from an oblique direction of the wraparound-type spectacle frame, and FIG. 3B is a perspective view as viewed from above the wraparound-type spectacle frame.

FIG. 6 is a diagram of astigmatic aberrations, mean dioptric power distributions, and astigmatic aberrations without prescribed astigmatism for lenses No. 5 through No. 8 according to an exemplary embodiment of the present invention.

DETAILED DESCRIPTION OF EXEMPLARY EMBODIMENTS OF THE INVENTION

Hereinafter, a design method for a spectacle lens, a spectacle lens, and spectacles in exemplary embodiments according to the invention will be described. The invention is not limited in scope to these exemplary embodiments.

Figure 3A:
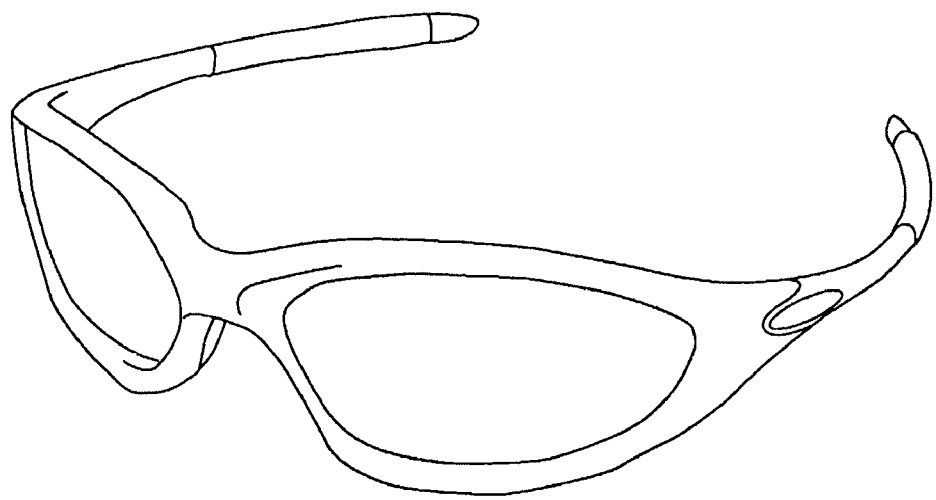
FIGS. 3A and 3B are illustrations of a wraparound-type spectacle frame.
Figure 3B:
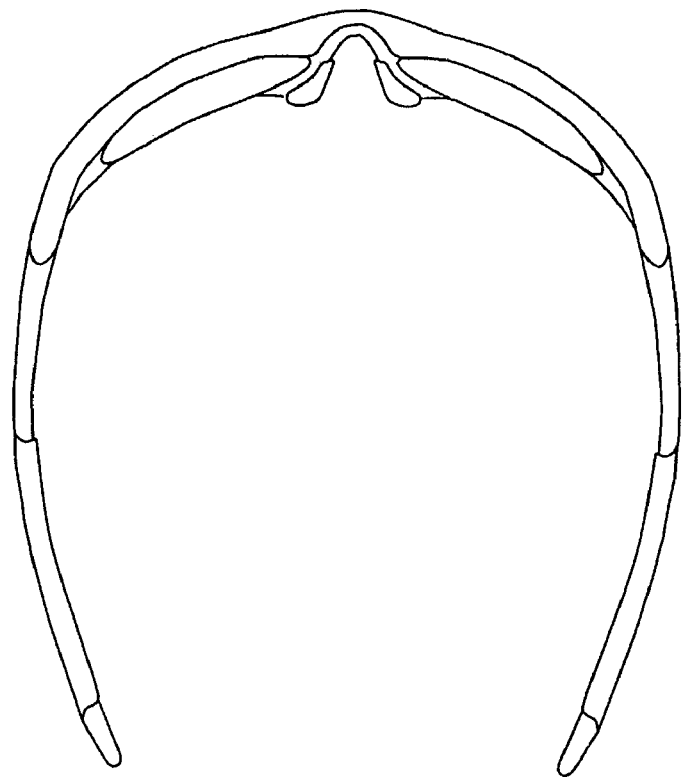
Figure 4A:
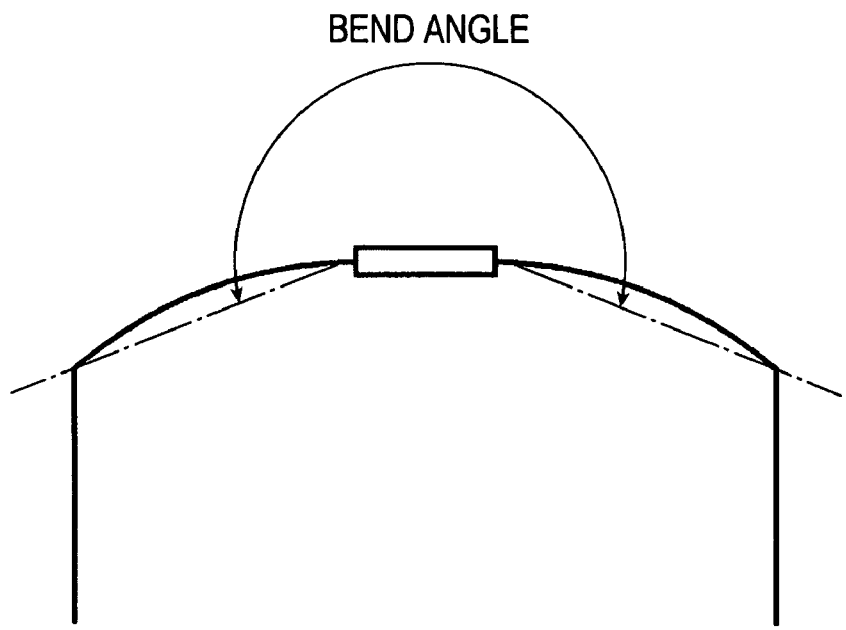
FIGS. 4A and 4B are illustrations of a bend angle and an pantoscopic angle, respectively.
Figure 4B:
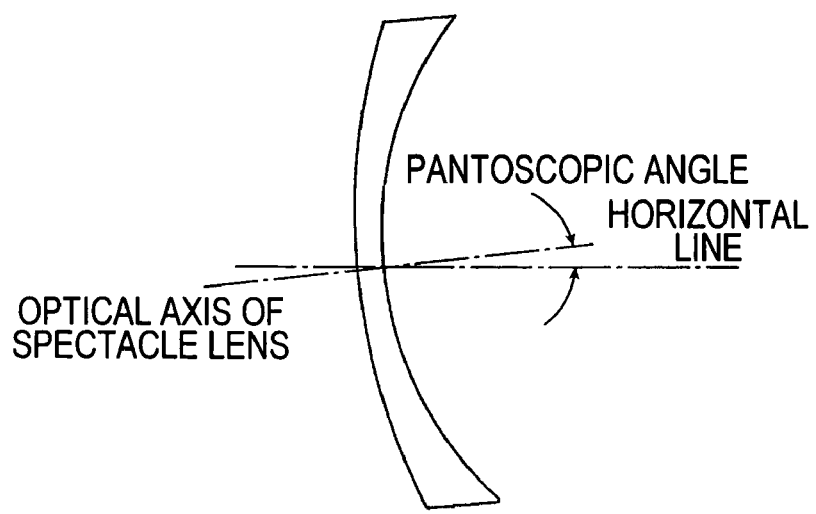

A design method of a spectacle lens according to an exemplary embodiment of the invention is a method for designing a spectacle lens which provides optimum optical properties when the spectacle lens is attached to a wraparound-type spectacle frame having a large bend angle as illustrated in FIGS. 3A and 3B. The bend angle of the spectacle frame refers to an angle formed by left and right surfaces of the rims as illustrated in FIG. 4A, and results in an inside bend condition where the inside bend angle is less than 180 degrees, and an outside bend condition where the outside bend angle is greater than 180 degrees. The spectacle lens design method according to an exemplary embodiment of the invention provides a design for a spectacle lens having optical properties suitable for a spectacle frame with an outside bend condition, such that the outside bend angle is greater than or equal to 200 degrees. An example is the wraparound-type spectacle frames available in the market, which have bend angles ranging from about 200 to about 250 degrees. A spectacle frame having a bend angle of 200 degrees or more is used for a wraparound-type spectacle frame as illustrated in FIGS. 3A and 3B, include water goggles, protection glasses, or the like.

The spectacle frame having an angle of 200 degrees or larger is curved along the shape of the wearer's face. The spectacle lens attached to the spectacle frame having a bend angle of 200 degrees or more requires a larger curvature than that of an ordinary spectacle lens. Thus, the spectacle lens in the spectacle frame is fixed in a position such that the lens is inclined with respect to a straight line of vision. The curvature of the object side of the refractive surface of the lens spectacle frames with a large bend angle is generally 5 dioptres or larger when expressed in units of power, but can typically range from 6 to 12 dioptres.

The object side refractive surface and the eyeball side refractive surface of the ordinary spectacle lens are designed such that the lens is attached to a spectacle frame having a bend angle of 180 degrees, i.e., the spectacle frame is not bent. For example, a spectacle frame used for an eye examination having no bend is used. When the spectacle lens has no bend angle and is fixed to the spectacle frame such that the lens is inclined with respect to vision in the spectacle frame, a problem arises with optical properties of the lens.

When the spectacle lens is attached to a spectacle frame having a large bend angle in such a condition that the lens is inclined with respect to vision, the power in the left-right direction is changed while the power in the up-down direction remains substantially unchanged. In this case, an aberration is caused which results in an astigmatic effect in the spherical surface of the lens. In addition, when the spectacle lens is inclined with respect to the vision, a prismatic power also results.

Thus, when the spectacle lens appropriate for the spectacle frame having the bend angle of 180 degrees is attached to a spectacle frame having a bend angle of 200 degrees or more, at least the prismatic power and the aberration caused by the bend angle produces astigmatic power are present on the spectacle lens. As a result, blurred images are perceived through the spectacle lens. The design method shown in JP-2005-284059 can solve this problem.

An exemplary embodiment of the present invention provides an improvement over the method disclosed in JP-A-2005-284059, by adding astigmatism correcting characteristics to the method disclosed in the reference. The design method according to the exemplary embodiment of the present invention is now discussed in conjunction with the method in JP-A-2005-284059.

According to the an exemplary embodiment of the present invention, an arbitrary design reference point is established on a refractive surface in a first step. Then, astigmatic power is added to the entire refractive surface to cancel astigmatic power produced by a bend angle on the object side refractive surface or the eyeball side refractive surface at the design reference point in a second step, referred to as the astigmatic power adding step. In a third step, referred to as the prismatic power adding step, prismatic power is added to the entire refractive surface so as to cancel prismatic power produced by the bend angle on the object side refractive surface or the eyeball side refractive surface at the design reference point. In a fourth step, astigmatic power for correcting astigmatism is added to the object side refractive surface or the eyeball side refractive surface in case of correction of astigmatism. In a fifth step, aspherical surface quantity, which simultaneously corrects the effects of the bend angle, dioptric power, and astigmatism dioptric power is added to the entire object side refractive surface or the entire eyeball side refractive surface including the design reference point thus correcting the aberration of the entire spectacle lens. The order of these steps may be switched, or interchanged, and either the second step or the third step may be performed instead of conducting both the second and the third step.

According to an exemplary embodiment of the present invention, when the spectacle lens, which is attached to the spectacle frame has an inclination angle, the astigmatic power adding step and the prismatic power adding step are performed between the third step and the fourth step, thus correcting the aberration caused by the bend angle. Since the inclination angle is generally small, this method makes it possible to eliminate the aberration caused at the design reference point.

Although the design reference point may be arbitrarily determined, generally a distance visual point is selected as the design reference point. The distance visual point is a cross point of the visual axis and the lens. The visual axis corresponds to the vision of the eyes located at a primary position, which is relative position of the head when the eyes are viewing an object located straight ahead of the eyes and at the same level as that of the eyes.

The aberration and prismatic power produced by the bend angle and inclination angle vary according to the bend angle, inclination angle, and the dioptric power of the spectacle lens fixed to the spectacle frame. As a result, it is necessary to correct the aberration caused by the bend angle, inclination angle, and dioptric power at the design reference point.

The refractive surface to which astigmatic power is added so as to cancel astigmatic power produced by the bend angle and inclination angle may be either the refractive surface on the object side or the refractive surface on the eyeball side. The axis of the spectacle lens added cylindrical power having the maximum absolute value of the power extends in the direction corresponding to the axis established when inclining the spectacle lens. For the bend angle, this axis coincides with a vertical line passing the design reference point. For the inclination angle, the axis coincides with a horizontal axis passing the design reference point.

The refractive surface to which prismatic power is added to cancel prismatic power produced by the bend angle and inclination angle may either be the refractive surface on the object side or the refractive surface on the eyeball side. The added prismatic power is inclined with its center located at the reference point such that the nose side is located at the base position with respect to the bend angle, and such that the upper side is located at the base position with respect to the inclination angle.

It is possible to add astigmatic power to the object side refractive surface and prismatic power to the eyeball side refractive surface, or add the astigmatic and prismatic powers to the opposite side refractive surfaces. It is also possible to add both astigmatic power and prismatic power to the eyeball side of the refractive surface such that a refractive surface has the combination of these powers.

However, the entire spectacle lens cannot be completely corrected by only correcting the astigmatism and the prism produced by the bend angle and inclination angle at the design reference point, because the spectacle lens, which is inclined in the left-right direction and up-down direction with respect to the vision, has asymmetrical inclination angles in the left-right direction and in the up-down direction at the design reference point with respect to the vision.

Also, the aspherical surface quantity for optimizing correction of the effect of the asymmetrical inclination angles in the left-right direction and up-down direction at the design reference point with respect to the vision also varies according to the target dioptric power of the spectacle lens. Since the target dioptric power of the lens with astigmatic correcting characteristics varies according to the angles of meridians, it is necessary to consider the effect of variations of the target dioptric power according to the angles of the meridians in order to obtain optimal optical characteristics.

According to an exemplary embodiment of the present invention, the aspherical surface quantity for optimizing the optical characteristics by simultaneously correcting the effect of the bend angle, inclination angle, dioptric power, and astigmatism dioptric power for the entire object side refractive surface or the entire eyeball side refractive surface including the design reference point is calculated by the following first through third steps.

In the first step for calculating the aspherical surface quantity, a plurality of reference meridians are established. The method for establishing the reference meridians is now explained with reference to FIGS. 1A and 1B and FIGS. 2A through 2C. In a preceding step, a design reference point D has been established either on the object side refractive surface (outside surface) or on the eyeball side refractive surface (inside surface). The design reference point determined in the preceding step may be used as the design reference point D for the step of calculating the aspherical surface quantity.

FIGS. 1A and 1B schematically show the setting of the reference meridians. A visual axis VA is the vision of the eyes located at the first eye position with respect to the head under the condition where the eyes are viewing an object located straight before the eyes at the same level of the eyes. FIG. 1A shows the condition in which the normal line (arrow A) at the design reference point D corresponds to the visual axis VA assuming that the optical surface, on which the design reference point D is established, is a spherical surface. In this case, the spectacle lens is disposed in such a condition that the lens is attached to a spectacle frame having the bend angle of 180 degrees with no inclination angle.

As illustrated in FIG. 1B, when the spectacle lens is attached to a spectacle frame having a large bend angle and a certain inclination angle, the normal line (arrow A') at the design reference point D of the spectacle lens is inclined with respect to the visual axis VA by a predetermined inclination quantity (inclination angle) in a predetermined inclination direction from the original arrow A according to the bend angle and inclination angle. When the inclination angle is zero or a negligible value, the inclination direction of the normal line at the design reference point D is in the horizontal direction as illustrated in FIG. 1A. FIG. 1B shows an example in which the design reference point D is set on the outside surface of the spectacle lens for the left eye. When the design reference point D is set on the inside surface, the direction of the arrow is reversed from the direction indicated in FIG. 1B. Also, the inclination direction is opposite between the lenses for the right eye and the left eye.

Figure 2A:
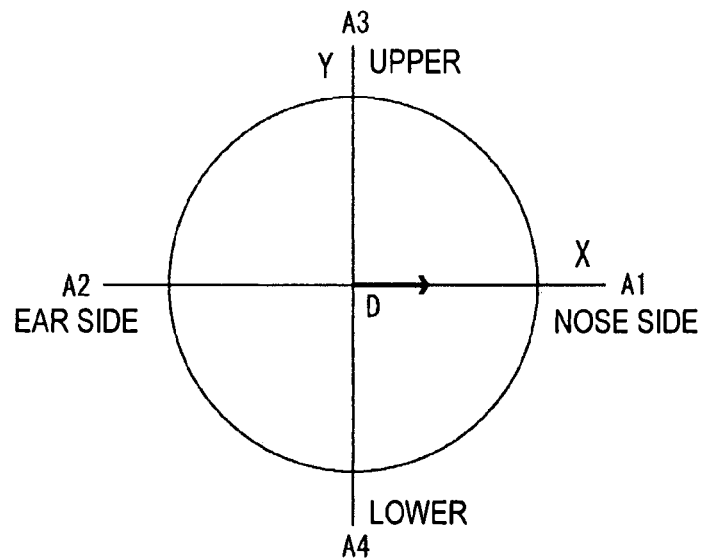
FIGS. 2A through 2C are schematic illustrations of the reference meridians.
Figure 2B:
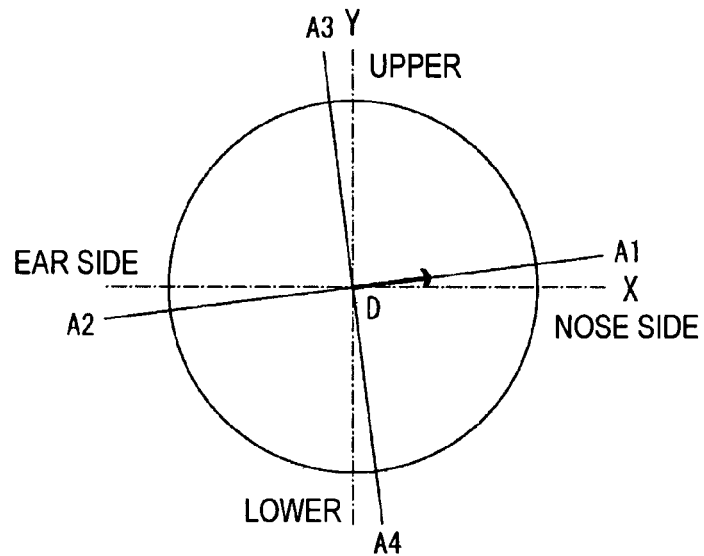
Figure 2C:
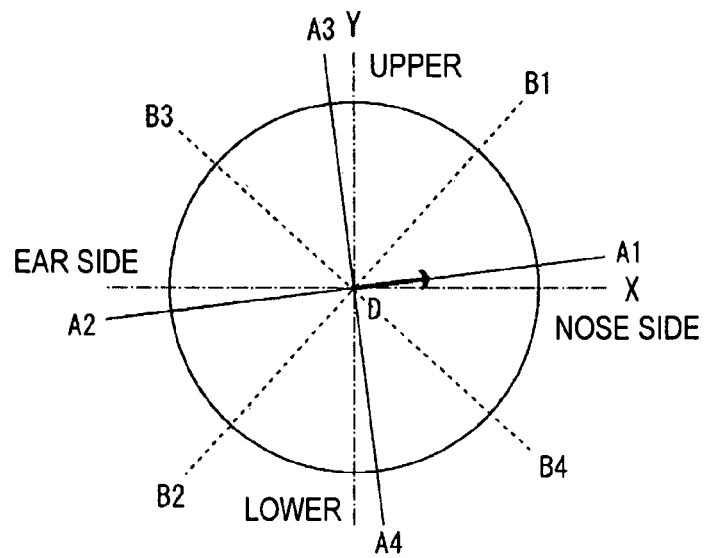

FIGS. 2A through 2C illustrate the reference meridians. The reference meridians shown in FIG. 2A are reference meridians when no inclination angle is provided. According to an exemplary embodiment of the present invention, when there is only a bend angle, the inclination direction of the normal line of the spectacle lens for either the right eye or the left eye at the design reference point D extends in the horizontal direction along the X axis from the design reference point D toward the outside edge of the lens on the nose side as indicated by the arrow under the condition where the design reference point D is set on the inside surface. The line extending from the design reference point D to the outside edge of the lens in this inclination direction is determined as a first reference meridian A1. The line extending from the design reference point D to the outside edge on the ear side in the direction opposite that of the first reference meridian A1 is determined as a second reference meridian A2. The line crossing the first reference meridian A1 at the design reference point D at right angles and extending from the design reference point D to the upper outside edge of the lens is determined as a third reference meridian A3. The line extending from the design reference point D to the lower outside edge of the lens in the direction opposite to that of the third reference meridian A3 is determined as a fourth reference meridian A4. The cross-shaped first through fourth reference meridians A1 through A4 indicate the directions where the effect of the bend angle is at its maximum and minimum. Also, the first through fourth reference meridians A1 through A4 shown in FIG. 2A correspond to the vertical and horizontal directions.

Reference meridians shown in FIG. 2B occur when the inclination angle is present as well as the bend angle. As shown in FIG. 2B, the directions of the first through fourth reference meridians A1 through A4 indicated by the arrows, are slightly inclined from the vertical and horizontal directions by the addition of the inclination angle.

FIG. 2C shows an example of reference meridians established not only for correcting the effects of the bend angle and inclination angle but also for correcting a prescribed astigmatism, by adding a toric surface, for example. In this case, as well as the first through fourth reference meridians A1 through A4, the following lines are established. The line extending from the design reference point D to the outside edge on one side of the lens along the astigmatic axis passing the design reference point D is determined as a first astigmatic reference meridian B1. The line extending from the design reference point D to the outside edge of the lens in the opposite direction of the first astigmatic reference meridian B1 is determined as a second astigmatic reference meridian B2. The line crossing the first astigmatic reference meridian B1 extending from the design reference point at right angles and extending to the outside edge of the lens on one side is determined as a third astigmatic reference meridian B3. A line extending to the outside edge in the direction opposite to that of the third astigmatic reference meridian B3 is determined as a fourth astigmatic reference meridian B4. The first through fourth astigmatic reference meridians B1 through B4 correspond to chief meridians of an astigmatic power lens.

According to the invention, only the four meridians of the first through the fourth reference meridians A1 through A4 are used when correction for astigmatism is not necessary. On the other hand, at least all eight meridians, the first through fourth astigmatic reference meridians B1 through B4 and the first through fourth reference meridians A1 through A4 are used when correction for astigmatism is necessary. However, when the first through fourth astigmatic reference meridians B1 through B4 coincide with the first through fourth reference meridians A1 through A4, the first through fourth reference meridians A1 through A4 are established as reference meridians.

It is possible to arbitrarily use additional reference meridians between any meridians of the first through fourth reference meridians A1 through A4 and the first through fourth astigmatic reference meridians B1 through B4 to enhance the interpolation accuracy.

In the step of calculating the aspherical surface quantity according to the spectacle lens method of the exemplary embodiment of the invention, after establishment of the reference meridians in a first step, the aspherical surface quantity providing optimum optical properties on each reference meridian is calculated for each reference meridian in a second step. The aspherical surface quantity in this case refers to the difference between the visual axis, the z-axis, direction and a reference spherical surface which includes the design reference point D and the lens outside edge. More specifically, light tracing method is employed for each reference meridian, for example, and a coefficient in the following aspherical surface equation. The aspherical surface equation which provides a z-axis direction coordinate on each reference meridian is calculated, for example, to correct the effect of the bend angle, inclination angle, dioptric power, astigmatism dioptric power for astigmatism correction and provide optimum optical properties where: z is the z-direction coordinate on the curved surface; r is the distance from the optical axis in the direction crossing the optical axis at right angles; c is a curvature at the vertex; and k and Ai are aspherical surface coefficients.

$$z = \frac{cr^2}{1+\sqrt{1-(1+k)c^2r^2}} + \sum_{i=1} A_i r^i$$

The second and subsequent terms in the aspherical surface equation are aspherical surface terms, and the degree of the aspherical surface, which allows for the aspherical surface quantity to be calculated from the coefficient Ai.

According to the spectacle lens design method of the exemplary embodiment of the invention, after the aspherical surface quantities on the reference meridians in the second step are calculated, the aspherical surface quantities between the reference meridians are calculated by interpolation so as to obtain the aspherical surface quantity at each point of the entire refractive surface as the aspherical surface. The optical properties of the entire surface of the lens can be corrected by adding the calculated aspherical surface quantities to the surface shape of the refractive surface as the aspherical surface. For interpolation, the following method can be employed, for example. The aspherical surface coefficients Ai of the respective degrees are plotted for the respective angles of the reference meridians, and a curved line smoothly connects these aspherical surface coefficients. Then, the aspherical surface coefficients for the respective degrees of an arbitrary angle are calculated from the curved line so as to obtain the aspherical surface terms.

The inclination directions of the normal lines at the design reference point as determined by the bend angle, and inclination angle and the direction crossing the inclination direction at right angles are established as the reference meridians for the following reason. These directions are directions where the variation of the inclination produced by the bend angle and inclination angle is at its maximum and minimum. Therefore, these directions correspond to directions where the aberration caused by the inclination and dioptric power deviation from the target dioptric power becomes the maximum and the aberration, which is caused when the inclination and dioptric power deviation from the target dioptric power is at its minimum. Thus, the accuracy in interpolation enhances when these directions are established as the reference meridians. When the inclination angle is zero or a negligible value, for example, the vertical line passing the design reference point D coincides with the third reference meridian A3 and the fourth reference meridian A4. In this case, these meridians have the smallest effect from the bend angle.

The astigmatic axis is used for the reference meridians because the astigmatic axis and the direction crossing the astigmatic axis at right angles indicate the directions of the maximum power and the minimum power, and therefore the accuracy of interpolation's enhanced when these directions are established as the reference meridians.

Astigmatic power is added to the front surface or rear surface to correct the dioptric power deviation of the lens at the design reference point caused by the bend angle and inclination angle. However, when the astigmatic powers for prescribed astigmatism correction for correction of the effect are combined, it is possible that the astigmatic axis after correction and the astigmatic axis before correction do not agree with each other. In this case, the reference meridians in the astigmatic axis direction and in the direction crossing the astigmatic axis at right angles in all the reference meridians may be either the astigmatic axis before correction or the astigmatic axis after correction.

According to the spectacle lens method of an exemplary embodiment of the present invention, the optical characteristics of the spectacle lens attached to wraparound-type spectacle frame having a large bend angle can be optimized. Particularly, when astigmatism correction characteristics are factored in, the addition of aspherical surface quantities for correcting the effect caused by variation of the target dioptric power according to the angles of the meridians due to astigmatism prescription can be calculated simultaneously with the added aspherical surface quantities for correcting the effect of the bend angle and inclination angle. Thus, by using this method it is possible for the first time to add astigmatic correction characteristics to the spectacle lens attached to the wraparound-type spectacle frame having a bend angle larger than 200 degrees.

The development of spectacles having spectacle lenses provided with astigmatism correction characteristics and attached to a wraparound-type spectacle frame having a bend angle larger than 200 degrees is useful for those who need astigmatism correction and also desire to use the wraparound-type spectacle frame.

EMBODIMENTS

In an exemplary embodiment of the present invention, a right-eye lens which has a spherical surface having power of 8.00 D (dioptres) on the object side refractive surface (front surface), astigmatic surface having power of 11.04 D in the direction of 45 degrees and power of 13.04 D in the direction of 135 degrees on the eyeball side refractive surface (rear surface) as viewed from the front surface, spherical power of 3.00 D, astigmatic power of 2.00 D, astigmatic axis of 45 degrees, central thickness of 1.1 mm, and material refractive index of 1.662 is used as a basic example lens.

Embodiment 1

Figure 5:
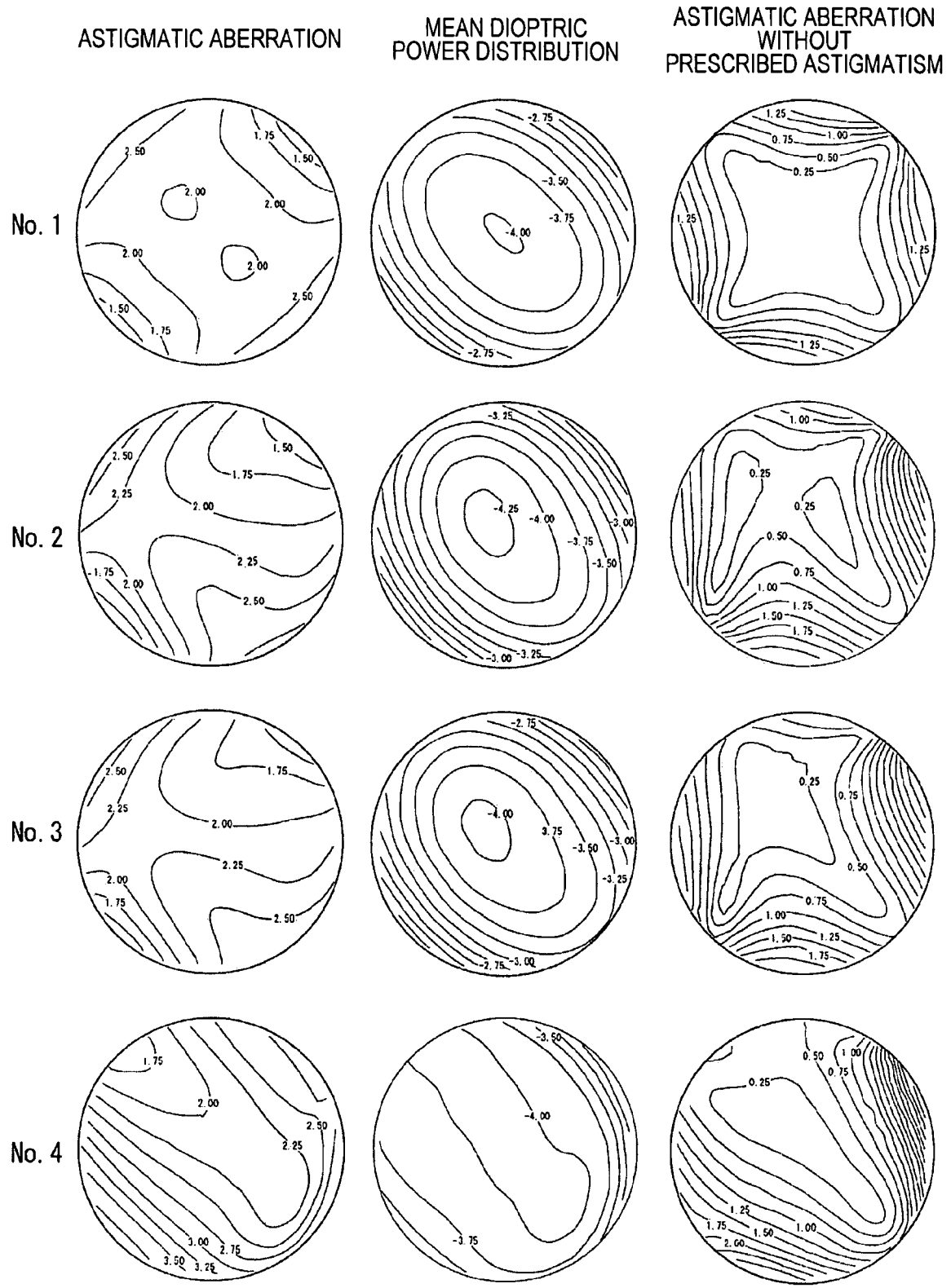
FIG. 5 is a diagram of astigmatic aberrations, mean dioptric power distributions, and astigmatic aberrations without prescribed astigmatism for lenses No. 1 through No. 4 according to an exemplary embodiment of the present invention.

FIG. 5 shows visual aberrations, visual average dioptric power distributions, and visual aberrations without prescribed astigmatism obtained by removing the prescribed astigmatism dioptric power from the visual aberrations for the lenses No. 1 through No. 4. The results in the figures are all viewed from the rear surface side of the lens, and the geometric centers of the results correspond to the design reference point. The contour interval is 0.25 dioptre.

Lens No. 1 is a basic lens attached to a frame having a bend angle of 180 degrees and an inclination angle of zero degrees.

Lens No. 2 is a basic lens inclined with its center located at the distance visual point on the rear surface and attached to a frame having a bend angle of 212 degrees and an inclination angle of zero degrees. The distance visual point on the rear surface corresponds to the design reference point.

Lens No. 3 is a lens after correction of the effect of the bend angle at the design reference point of lens No. 2. The rear surface is an astigmatic surface having power of 10.81 D in the direction of 41.15 degrees and power of 12.83 D in the direction of 131.15 degrees as viewed from the front surface. Also, the rear surface is inclined by 0.128 degrees, or with a prismatic power of 0.157 prism dioptre, in the horizontal direction with its center located at the design reference point such that the nose side of the lens is disposed at the base position for prismatic correction.

Lens No. 4 is a lens designed by the method according to the exemplary embodiment of the present invention by adding aspherical surface component for simultaneously correcting the effects of the bend angle and the astigmatism dioptric power to the rear surface of lens No. 3. The distance visual point on the rear surface corresponds to the design reference point. The reference meridians used are eight meridians, which include zero degrees (first reference meridian), 45 degrees (first astigmatic reference meridian), 90 degrees (third reference meridian), 135 degrees (third astigmatic reference meridian), 180 degrees (second reference meridian), 225 degrees (second astigmatic reference meridian), 270 degrees (fourth reference meridian), and 315 degrees (fourth astigmatic reference meridian) as viewed from the front surface side.

Embodiment 2

According to an exemplary embodiment of the present invention, FIG. 6 shows visual aberrations, visual average dioptric power distributions, and visual aberrations without prescribed astigmatism obtained by removing prescribed astigmatism dioptric power from the visual aberrations for lenses No. 5 through No. 8. The results in the figure are all viewed from the rear surface side of the lens, and the geometric centers of the results correspond to the design reference point. The contour interval is 0.25 dioptre.

Lens No. 5 is a basic lens attached to a frame having a bend angle of 180 degrees and an inclination angle of zero degrees (the same as lens No. 1).

Lens No. 6 is a basic lens inclined with its center located at the distance visual point on the rear surface and attached to a frame having a bend angle of 210.91 degrees and an inclination angle of 4.14 degrees (inclination direction: 345 degrees, inclination angle: 16 degrees). The distance visual point on the rear surface corresponds to the design reference point.

Lens No. 7 is a lens after correction of the effect of the inclination angle at the design reference point of lens No. 6. The rear surface is an astigmatic surface having power of 10.78 D in the direction of 42.48 degrees and power of 12.89 D in the direction of 132.48 degrees as viewed from the front surface. Simultaneously, the rear surface is inclined by 0.128 degrees, or with a prismatic power of 0.157 prism dioptre, with its center located at the design reference point such that the side opposite to the inclination direction, or 165 degrees as viewed from the front surface of the lens corresponds to the base position for prismatic correction.

Lens No. 8 is a lens designed according to the exemplary embodiment of the present invention, by adding aspherical surface component for simultaneously correcting the effect of the bend angle and inclination angle, and the astigmatism dioptric power of the rear surface of the lens No. 7. The reference meridians used are twelve meridians, which include 15 degrees and 45 degrees (astigmatic axis direction), 75 degrees (direction crossing inclination direction at right angles), 105 degrees and 135 degrees (direction crossing astigmatic axis at right angles), 165 degrees (inclination direction), 195 degrees and 225 degrees (astigmatic axis direction), 255 degrees (direction crossing inclination direction at right angles), 285 degrees and 315 degrees (direction crossing astigmatic axis at right angles), and 345 degrees (inclination angle) as viewed from the front surface side of the lens.

The advantages of this exemplary embodiment of the present invention are apparent from a comparison between lenses No. 3 and No. 4 and a comparison between lenses No. 7 and No. 8 in the exemplary embodiment. According to lenses No. 3 and No. 7, the visual average dioptric power greatly varies from the center to the outer circumference, and thus correction is insufficient on the lens outer circumference for correcting astigmatism. According to the lenses No. 4 and No. 8 obtained according to the exemplary embodiment of the present invention, the visual average dioptric power is substantially uniform throughout the entire surface of the lens. Thus, lenses obtained according to the exemplary embodiment of the present invention remedies the problem of deviation from the prescribed dioptric power.

The exemplary embodiment of the present invention is applicable in the manufacture of a spectacle lens capable of appropriately correcting the vision of a wearer of the spectacle lens when the spectacle lens are attached to a wraparound-type spectacle frame having a large bend angle.

The foregoing embodiments are merely exemplary and are not to be construed as limiting the present invention. Also, the description of the exemplary embodiments of the present invention is intended to be illustrative, and not to limit the scope of the claims, and many alternatives, modifications, and variations will be apparent to those skilled in the art.

What is claimed is:

1. A method for designing a spectacle lens mounted in a spectacle frame having a bend angle of 200 degrees or larger, comprising:

adding astigmatic power on an object side refractive surface or an eyeball side refractive surface of the spectacle lens, for canceling aberration, caused by the bend angle of the spectacle frame, at a design reference point of the spectacle lens;

setting prismatic power by tilting the refractive surface, which is on an object side or an eyeball side, of the spectacle lens for canceling prismatic power, caused by the bend angle of the spectacle frame, at the design reference point of the spectacle lens;

extending a first reference meridian from the design reference point to the edge of the spectacle lens in a first direction which direction is a projected direction when a surface normal line at the design reference point of the spectacle lens having the bend angle of the spectacle frame is projected on a flat plane crossing a visual axis at a right angle;

extending a second reference meridian from the design reference point to the edge of the spectacle lens in a second direction opposite to the first direction;

extending a third reference meridian from the design reference point to the edge of the spectacle lens in a third direction, wherein the third reference meridian crosses the first reference meridian at the reference point at a right angle;

extending a fourth reference meridian from the design reference point to the edge of the spectacle lens in a fourth direction opposite to the third direction;

setting a plurality of reference meridians including at least the first reference meridian, the second reference meridian, the third reference meridian, and the fourth reference meridian;

obtaining aspherical surface quantities optimizing optical performance on the respective reference meridians after the setting step; and obtaining aspherical surface quantities between the respective reference meridians by interpolation after the obtaining step.

2. The method for designing the spectacle lens according to claim 1, further comprising:

when the spectacle lens is an astigmatic power lens, extending a first astigmatic reference meridian from the design reference point of the spectacle lens to the edge of the spectacle lens in a fifth direction along a cylinder axis;

extending a second astigmatic reference meridian from the design reference point to the edge of the spectacle lens in a sixth direction opposite to the fifth direction;

extending a third astigmatic reference meridian from the reference design point to the edge of the spectacle lens in a seventh direction, wherein the third astigmatic reference meridian crosses the first astigmatic reference meridian at the design reference point at a right angle;

a fourth astigmatic reference meridian extending from the design reference point to the edge of the spectacle lens in an eighth direction opposite to the seventh direction; and setting a plurality of reference meridians including at least the first reference meridian, the second reference meridian, the third reference meridian, the fourth reference meridian, the first astigmatic reference meridian, the second astigmatic reference meridian, the third astigmatic reference meridian, and the fourth astigmatic reference meridian.

3. The method for designing the spectacle lens according to claim 1, further comprising:

adding astigmatic power on the object side refractive surface or eyeball side refractive surface of the spectacle lens, which cancels aberration caused by a pantoscopic angle of the spectacle frame, at the design reference point of the spectacle lens; and setting prismatic power by tilting the refractive surface, which is on an object side or an eyeball side, of the spectacle lens for canceling prismatic power, caused by the pantoscopic angle of the spectacle frame, at the design reference point of the spectacle lens;

wherein a line extending from the design reference point to the edge of the spectacle lens in a direction is the first reference meridian, the direction is a projected direction when a surface normal line at the design reference point of the spectacle lens having the bend angle and the pantoscopic angle of the spectacle frame is projected on a flat plane crossing the visual axis at right angles.

4. The method for designing the spectacle lens according to claim 1, wherein the first reference meridian, the second reference meridian, the third reference meridian, and the fourth reference meridian occur where an effect of the bend angle is at a maximum and a minimum.

5. A spectacle lens manufactured by the method for designing the spectacle lens according to claim 1.

6. A spectacle lens that is mounted in a spectacle frame having a bend angle of 200 degrees or larger and is an astigmatic power line according to the method recited in claim 1.

* * * * *